United States Patent Office 2,905,531
Patented Sept. 22, 1959

2,905,531

PRODUCTION OF ALKALINE EARTH METAL SILICATES

Richard Eugene Schneider, Barberton, Ohio, assignor to Columbia-Southern Chemical Corporation, Allegheny County, Pa., a corporation of Delaware No Drawing. Application March 13, 1956
Serial No. 571,154

8 Claims. (Cl. 23—110)

The present invention concerns the manufacture of alkaline earth metal silicates, especially calcium silicate, and more particularly deals with facilitating recovery of alkaline earth metal silicates from aqueous slurries thereof.

Amorphous water insoluble alkaline earth metal silicates such as calcium silicate may be prepared by reaction of calcium chloride and sodium silicate in aqueous media. Being water insoluble, the calcium silicate precipitates and the reaction product is initially as an aqueous slurry. It is usually necessary to recover the calcium silicate from the slurry by various mechanical separations such as decantation, filtration, centrifugation or combinations thereof. The economics of recovery are a material factor in the cost of preparing the product.

For the most part, relatively dilute aqueous calcium silicate slurries are handled, e.g., slurries containing on the order of 0.5 to 20 percent by weight of mechanically separable solids prior to any mechanical separation. Thus, recovery of calcium silicate from aqueous slurries involves handling a considerable volume of water, and may be both cumbersome and expensive. The recovery of calcium silicate from its aqueous slurries is additionally complicated by the tendency of the precipitated calcium silicate, which is a finely divided, pigmentary material, to remain well dispersed.

According to the present invention, the difficulties encountered in recovering water insoluble alkaline earth metal silicate from aqueous slurries may be substantially obviated, and instead the recovery may be conducted more rapidly, with greater ease and at less cost. It has now been discovered that this tendency of water insoluble alkaline earth metal silicates to remain dispersed in an aqueous medium is diminished and the settling of the solids accelerated by the presence in the slurry of a substantial quantity of calcium chloride or comparable alkaline earth metal salt. When the contents of the slurry are adjusted to include at least about 0.15 mole of calcium chloride per mole of calcium silicate, the solids settle with comparable ease. This leaves a clear supernatant liquid upon standing for shortened periods of time. By decantation, a goodly portion of the water is removed without consequential loss of solids. Since decantation is one of the least costly expedients for removing solids from slurries, practice of this invention to facilitate decantation is especially valuable.

An important feature of the present invention involves including a suitable alkaline earth metal salt concentration in the slurry prior to solid recovery. With at least 0.15 mole of calcium chloride per mole of calcium silicate in the slurry, the settling of solids is accelerated and otherwise facilitated. Even larger amounts of calcium chloride may be used, but practical considerations usually limit the maximum amount to about 0.3 mole of calcium chloride per mole of calcium silicate. The quantity of calcium chloride utilized herein may be expressed otherwise, i.e., in terms of a portion of the calcium chloride which would have been required to prepare the calcium silicate had it been prepared by reaction of calcium chloride and calcium silicate. On this basis, between 15 and 30 mole percent of the calcium chloride which would be so required is necessary.

In many procedures, provision of the specified quantity of calcium chloride in the aqueous slurry is achieved simply by adding the amount of calcium chloride, which amount is predetermined by reference to the above yardsticks. Should the aqueous slurry already contain some calcium chloride in a quantity insufficient to facilitate settling, the amount of calcium chloride that need be added may be diminished accordingly.

Aqueous slurries of water insoluble alkaline earth metal silicates in which the desirable alkaline earth metal chloride concentration is established may be derived from various sources. They may be provided by reslurrying in water essentially dry calcium silicate, or like alkaline earth metal silicate, for the purposes of further washing and purifying the silicate. Or, as is frequently the case, the slurries may be those which result from the preparation of calcium silicate in aqueous medium. One such preparation involves reacting calcium chloride and sodium silicate in aqueous medium and precipitating calcium silicate thereby forming the slurry. This slurry may be treated directly, or may be further diluted with water to accomplish washing. The washing serves to remove water soluble salts such as sodium chloride which are present as by-products of the reaction.

The alkaline earth metal silicate concentration in these slurries is susceptible of wide latitude. As a practical matter, slurries containing from 1 to 20 percent solid alkaline earth metal silicate by weight of the slurry are those most expeditiously and efficiently handled. When a particularly thorough wash is desired, the solids content may even be lower, e.g., 0.5 percent by weight. Solid contents upwards of 30 percent by weight of the slurry may on occasion also be handled. Thus, the inclusion of calcium chloride to an aqueous slurry having any practical calcium silicate concentration will facilitate recovery.

As indicated, decantation is an especially advantageous mechanical expedient for separating of a goodly portion of the water. By decantation, the various techniques in which separation of solid and liquid phases is effected by permitting at least partial settling of the solids from the slurry coupled with flowing off of the liquid phase are intended. The decantation need not be the sole mechanical expedient for removing the water. It may be coupled with a filtration, a centrifugation, or in certain instances with thermal drying.

A particularly advantageous embodiment thereof involves utilizing decantation to partially concentrate the solid content of the slurry. Mechanical thickeners, i.e., the various Dorr thickeners, are used with special advantage in the concentration of aqueous calcium silicate slurries. Within the limitations of the specific mechanical thickener, it is possible to concentrate the calcium silicate while simultaneously washing to remove water soluble salts such as sodium chloride. A plurality of such mechanical thickeners can be operated in series with the liquid passing countercurrent to the flow of slurry. Such arrangement has concentrated a slurry containing 7 percent solids by weight to one containing 30 percent solids by weight. The concentrated slurry can thereafter be filtered or centrifuged to remove additional water.

The essentially water insoluble alkaline earth metal silicates which are finely divided, pigmentary, hydrated, amorphous materials when recovered are most favorably employed in the present invention. Their extreme fineness apparently is at least in part responsible for their tendency to remain dispersed in aqueous media. When viewed under the electron microscope, these alkaline earth metal silicates appear in the form of flocs of fine ultimate alkaline earth metal silicate particles. The ultimate particles are below 1.0 micron and usually are from 0.1 to 0.3 micron. Under high magnification, their flocs resemble grape clusters and appear as loosely connected agglomerates of the ultimate silicate particles. The flocs range in size from about 0.5 micron to 10 microns with a goodly majority usually being below 7 microns. As a rule, the surface area of these alkaline earth metal silicates ranges from 5 to 150 square meters per gram, as measured by the Brunauer-Emmett-Teller method described in the Journal of the American Chemical Society, volume 60, page 309 (1938).

Alkaline earth metal silicate slurries comprised of alkaline earth metal silicates such as calcium silicate which range from 5 to 30 square meters per gram in surface area frequently are the most difficult to handle. They are particularly prone to remain dispersed. Treatment of slurries containing such low surface area alkaline earth metal silicates is accordingly of particular value.

Such alkaline earth metal silicates also contain water even after mechanical removal thereof is complete. Two types of water are present. One is "free water" and the other "bound water." "Free water" is the water which is removed by heating the silicate to 105° C. for a period up to 25 hours. "Bound water" denotes the amount of water driven off by heating the silicate at ignition temperatures, e.g., 1000° C. to 1200° C., until no further water can be removed less the "free water" removed from the silicate. The "free water" content normally is about 2 to 10 percent by weight of the pigment. "Bound water" is present in amounts of 2 to 10 percent by weight.

The chemical composition exclusive of water of the calcium silicate, or like alkaline earth metal silicate, which comprises the solid component of the slurries, is of the composition $CaO\,(SiO_2)_x$, where $x$ is a value ranging from about 2 to about 5, and more usually from 2.5 to 4.5. Values of $x$ even higher than 5 are also possible.

The following example illustrates the present invention:

EXAMPLE I

The preparation of finely divided, low surface area, calcium silicate slurry was conducted in a 100-gallon rubber-lined tank provided with a 1½ inch feed line in the form of a horizontal distributor spanning the tank top for multiple stream addition of sodium silicate solution. A product removal line 2 inches in diameter was disposed in the tank at a point representing its 60-gallon level, and was provided with an external leg to control the liquid contents of the tank at between 60 to 85 gallons. Aqueous calcium chloride solution was introduced through a 1½ inch line into the bottom of the tank. Air was passed into the bottom of the reactor, imparting a general rolling agitation to the slurry therein.

Aqueous solutions of the respective reactants containing 100 grams per liter of calcium chloride and 100 grams per liter of $SiO_2$ were fed to the reactor through their respective feed lines at average feed rates of 5.5 gallons per minute of silicate solution and 3.0 gallons per minute of calcium chloride solution. Specially designed pumps equipped with hydraulic variable speed drives pumped the feed at controlled rates.

The precipitated slurry containing 7.5 percent solids by weight was withdrawn from the tank at a rate corresponding to the rate of its formation. To this withdrawn slurry was added aqueous calcium chloride at a rate and in a quantity equivalent to 10 percent of the calcium chloride consumed in the formation of the calcium silicate. As a result of adding this calcium chloride, the slurry contained 0.15 mole of calcium chloride per mole of calcium silicate. Thereafter the slurry was washed at 105° C. in a two-Dorr tank system with water. From the second Dorr tank a slurry containing 17.5 solids by weight was obtained. A marked improvement in the operation of the Dorr tank system was observed.

This washed slurry from the second Dorr tank was filtered in a Bird-Young filter and dried in a Wyssmont dryer. The filter cake contained 27.2 percent by weight solids. Thereafter, the pigment was milled in a vertical mill arrangement providing a product containing less than 0.1 percent residue in a 325 mesh screen. During this process, hourly samples were removed from the reaction tank and the surface area of the calcium silicate therein was determined. After filtering the solid contents of the slurry sample, the filtrate was analyzed for its calcium chloride content. The folowing tabulates the results:

| Sample Taken at Start of Hour | B.E.T. Surface Area, Square Meters/Gram | $CaCl_2$ in Filtrate, Grams/Liter |
| --- | --- | --- |
| 2 | 8 | 0.2 |
| 3 | 11 | 0.4 |
| 4 | 9 | 0.3 |
| 5 | 15 | 0.5 |
| 6 | 9 | 0.3 |
| 7 | 15 | 0.5 |

A composite sample of the product produced according to the above process was analyzed and had the following chemical and physical properties:

Free water _____percent by weight__ 4.4
NaCl _____do____ 0.15
CaO _____do____ 17.38
Ignition loss _____do____ 12.00
Mole ratio $SiO_2:CaO$ _____ 3.78
Surface area _____square meters per gram__ 13.6
Density _____ pounds per cubic foot__ 13.9

Under the electron microscope, the average ultimate particle size of the product was 0.1 to 0.3 micron. 68.8 percent by weight of the flocs were less than 7 microns.

EXAMPLE II

The importance of establishing an adequate minimum amount of calcium chloride in the slurry was demonstrated by permitting aqueous slurries of calcium silicate to stand under quiescent conditions with varying amounts of calcium chloride present therein. A calcium silicate slurry containing 7.5 percent by weight of solid calcium silicate was diluted as indicated in the hereinafter table, and permitted to stand. The time period required for a clear supernatant liquor was measured. Table I hereinafter lists the pertinent information:

*Table I*

| Dilution Ratio of Water to Slurry | Calcium Chloride Content [1] | Settling Time, Minutes [2] |
| --- | --- | --- |
| 3:1 | 0 | None. |
| 6:1 | 0 | Do. |
| 9:1 | 0 | Do. |
| 3:1 | 10 | 45—Clear. |
| 6:1 | 10 | 45—Cloudy. |
| 9:1 | 10 | Do. |
| 3:1 | 20 | 60—Clear. |
| 6:1 | 20 | Do. |
| 9:1 | 20 | Do. |

[1] Excess calcium chloride expressed as the mole percent excess over the stoichiometric amount of calcium chloride required for preparation of the calcium silicate.
[2] The term clear refers to the time required for a clear supernatant liquor to appear.

Although slurries of calcium silicate are those which are most frequently treated, other water insoluble alkaline earth metal silicates and mixed alkaline earth metal silicates are included. Calcium chloride is the preferred alkaline earth metal salt, especially when calcium silicate slurries are being treated. However, other alkaline earth metal chlorides such as strontium chloride and barium chloride function. Other water soluble alkaline earth metal salts such as strontium nitrate may be employed. For the most part, an alkaline earth metal salt in which

I claim:

1. A method of preparing an alkaline earth metal silicate which comprises forming an aqueous slurry of a water insoluble amorphous alkaline earth metal silicate having a tendency to remain well dispersed and containing less than 0.15 mole of alkaline earth metal salt per mole of the alkaline earth metal silicate, adding to the slurry sufficient water soluble alkaline earth metal salt to provide at least 0.15 mole of said salt per mole of alkaline earth metal silicate to thereby facilitate settling of the slurry and thereafter mechanically separating alkaline earth metal silicate.

2. In a method of preparing calcium silicate the step which comprises forming an aqueous slurry of amorphous calcium silicate having a tendency to remain well dispersed and containing less than 0.15 mole of calcium chloride per mole of calcium silicate, adding calcium chloride to the slurry in an amount sufficient to provide at least 0.15 mole of calcium chloride per mole of calcium silicate thereby facilitating settling the slurry and thereafter mechanically recovering calcium silicate.

3. A method of preparing calcium silicate which comprises reacting sodium silicate and calcium chloride in an aqueous medium to form an aqueous amorphous calcium silicate slurry having a tendency to remain well dispersed and containing less than 0.15 mole of calcium chloride per mole of calcium silicate, subsequent to completing said reaction adding calcium chloride to the slurry in an amount sufficient to establish in the slurry at least 0.15 mole of calcium chloride per mole of calcium silicate to thereby facilitate settling of the slurry and thereafter mechanically recovering calcium silicate.

4. In a method of producing calcium silicate, the steps which comprise forming an aqueous slurry of amorphous calcium silicate of 5 to 30 square meters per gram in surface area containing less than 0.15 mole of calcium chloride per mole of calcium silicate, adding calcium chloride to the slurry in an amount sufficient to provide at least 0.15 mole of calcium chloride per mole of calcium silicate to thereby facilitate settling of the slurry and thereafter mechanically recovering calcium silicate.

5. The method of claim 1 wherein the alkaline earth metal silicate is 5 to 30 square meters per gram in surface area.

6. In a method of producing calcium silicate, the steps which comprises forming an aqueous slurry of a water insoluble amorphous calcium silicate having a tendency to remain well dispersed and containing less than 0.15 mole of alkaline earth metal halide per mole of alkaline earth metal silicate, adding to the slurry sufficient water soluble alkaline earth metal halides to provide at least 0.15 mole thereof per mole of alkaline earth metal silicate to thereby facilitate settling of the slurry and thereafter mechanically separating alkaline earth metal silicate.

7. A method of preparing calcium silicate which comprises reacting sodium silicate and calcium chloride in an aqueous medium to thereby form an aqueous amorphous calcium silicate slurry having a tendency to remain well dispersed which contains less than 0.15 mole of calcium chloride per mole of calcium silicate, subsequent to completing said reaction adding calcium chloride in an amount sufficient to establish therein at least 0.15 mole of calcium chloride per mole of calcium silicate to thereby facilitate settling of the slurry, permitting the slurry to settle and thereafter recovering the calcium silicate by decantation.

8. The method of claim 7 wherein sufficient calcium chloride is added to establish between 0.15 mole and 0.3 mole of calcium chloride per mole of calcium silicate.

References Cited in the file of this patent

UNITED STATES PATENTS

| 2,287,700 | Muskat et al. | June 23, 1942 |
| 2,382,886 | Lee et al. | Aug. 14, 1945 |
| 2,434,418 | La Lande | Jan. 13, 1948 |
| 2,754,547 | Allen | July 17, 1956 |

OTHER REFERENCES

Webster's New International Dictionary, 2nd ed., unabridged.